(12) United States Patent
Fujishiro et al.

(10) Patent No.: US 10,356,840 B2
(45) Date of Patent: Jul. 16, 2019

(54) RADIO TERMINAL AND PROCESSOR FOR PERFORMING CONTROLS RELATED TO EXTENDED DISCONTINUOUS RECEPTION (DRX) OPERATION ACCORDING TO THE MOVING SPEED OF THE RADIO TERMINAL

(71) Applicant: KYOCERA Corporation, Kyoto-shi, Kyoto (JP)

(72) Inventors: Masato Fujishiro, Yokohama (JP); Henry Chang, San Diego, CA (US); Hiroyuki Adachi, Kawasaki (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/553,087

(22) PCT Filed: Feb. 26, 2016

(86) PCT No.: PCT/JP2016/055882
§ 371 (c)(1),
(2) Date: Aug. 23, 2017

(87) PCT Pub. No.: WO2016/136958
PCT Pub. Date: Sep. 1, 2016

(65) Prior Publication Data
US 2018/0049269 A1 Feb. 15, 2018

Related U.S. Application Data

(60) Provisional application No. 62/121,616, filed on Feb. 27, 2015, provisional application No. 62/162,204, filed on May 15, 2015.

(51) Int. Cl.
*H04W 76/28* (2018.01)
*H04W 52/02* (2009.01)
*H04W 4/02* (2018.01)

(52) U.S. Cl.
CPC ....... *H04W 76/28* (2018.02); *H04W 52/0216* (2013.01); *H04W 52/0229* (2013.01);
(Continued)

(58) Field of Classification Search
CPC ............ H04W 76/28; H04W 52/0216; H04W 52/0229
See application file for complete search history.

(56) References Cited

U.S. PATENT DOCUMENTS 9,204,395 B2* 12/2015 Li ..................... H04W 52/0229
2010/0009643 A1 1/2010 Haartsen
(Continued)

FOREIGN PATENT DOCUMENTS

JP 2013-201508 A 10/2013
JP 2014-514786 A1 6/2014
(Continued)

OTHER PUBLICATIONS

Qualcomm Incorporated, "New WI Proposal: RAN enhancements for extended DRX in LTE", 3GPP RP-141994, 3GPP TSG RAN Meeting #66, Dec. 2014, Maui, US.
(Continued)

*Primary Examiner* — Chi H Pham
*Assistant Examiner* — Weibin Huang

(57) ABSTRACT

A radio terminal according to one embodiment is used in a mobile communication system. The radio terminal comprises a controller configured to perform control related to a DRX operation for intermittently monitoring a downlink control channel based on a comparison result of a value related to a moving speed of the radio terminal and a threshold value when the extended DRX operation is set from a network.

19 Claims, 9 Drawing Sheets

(52) U.S. Cl.
CPC ........ *H04W 4/027* (2013.01); *H04W 52/0209* (2013.01); *Y02D 70/1226* (2018.01); *Y02D 70/1242* (2018.01); *Y02D 70/1262* (2018.01); *Y02D 70/164* (2018.01); *Y02D 70/21* (2018.01); *Y02D 70/24* (2018.01)

(56) References Cited

U.S. PATENT DOCUMENTS

| | | | |
|---|---|---|---|
| 2010/0317345 A1* | 12/2010 | Futaki | H04W 36/0055 455/436 |
| 2011/0158188 A1* | 6/2011 | Womack | H04W 56/0005 370/329 |
| 2012/0182896 A1 | 7/2012 | Jang et al. | |
| 2012/0252471 A1 | 10/2012 | Futaki | |
| 2013/0005339 A1 | 1/2013 | Iwamura | |
| 2013/0170415 A1* | 7/2013 | Fukuta | H04W 52/0216 370/311 |
| 2013/0194954 A1* | 8/2013 | Dalsgaard | H04W 24/10 370/252 |
| 2013/0201960 A1* | 8/2013 | Kim | H04L 1/1861 370/331 |
| 2014/0155076 A1 | 6/2014 | Wang | |
| 2014/0194125 A1* | 7/2014 | Wen | H04W 36/0088 455/437 |
| 2014/0247742 A1* | 9/2014 | Lee | H04W 52/0216 370/252 |
| 2014/0295820 A1* | 10/2014 | Kim | H04W 52/0216 455/418 |
| 2014/0335870 A1 | 11/2014 | Yilmaz et al. | |
| 2015/0208314 A1* | 7/2015 | Lorca | H04W 36/32 455/441 |
| 2015/0215830 A1* | 7/2015 | Dalsgaard | H04W 36/0094 455/444 |
| 2016/0212642 A1* | 7/2016 | Ljung | H04W 76/28 |

FOREIGN PATENT DOCUMENTS

| | | |
|---|---|---|
| JP | 2014-146865 A | 8/2014 |
| WO | 2011/083837 A1 | 7/2011 |

OTHER PUBLICATIONS

Broadcom Corporation, "Mobility Improvement for Long DRX", 3GPP TSG-RAN WG2 Meeting #85, R2-140423, Feb. 10-14, 2014, Prague, Czech Republic.

International Search Report (Form PCT/ISA/210) dated Apr. 12, 2016, issued for PCT/JP2016/055882.

* cited by examiner

FIG. 5

EXISTING DRX SETTING INFORMATION

```
DRX-Config ::=        CHOICE                          {
  release             NULL,
  setup               SEQUENCE                        {
    onDurationTimer             ENUMERATED              {
           psf1,                                         psf2, psf3, psf4, psf5, psf6,
           psf8,                                         psf10, psf20, psf30, psf40,
           psf50,                                         psf60, psf80, psf100,
           psf200},
    drx-InactivityTimer         ENUMERATED              {
           psf1,                                         psf2, psf3, psf4, psf5, psf6,
           psf8,                                         psf10, psf20, psf30, psf40,
           psf50,                                         psf60, psf80, psf100,
           psf200,                                        psf300, psf500, psf750,
           psf1280,                                       psf1920, psf2560, psf0-v1020,
           spare9,                                        spare8, spare7, spare6,
           spare5,                                        spare4, spare3, spare2,
           spare1},
    drx-RetransmissionTimer     ENUMERATED              {
           psf1,                                         psf2, psf4, psf6, psf8, psf16,
           psf24,                                         psf33},
    longDRX-CycleStartOffset    CHOICE                  {
      sf10         INTEGER(0..9),
      sf20         INTEGER(0..19),
      sf32         INTEGER(0..31),
      sf40         INTEGER(0..39),
      sf64         INTEGER(0..63),
      sf80         INTEGER(0..79),
      sf128                INTEGER(0..127),
      sf160                INTEGER(0..159),
      sf256                INTEGER(0..255),
      sf320                INTEGER(0..319),
      sf512                INTEGER(0..511),
      sf640                INTEGER(0..639),
      sf1024               INTEGER(0..1023),
      sf1280               INTEGER(0..1279),
      sf2048               INTEGER(0..2047),
      sf2560               INTEGER(0..2559)
    },
    shortDRX       SEQUENCE                           {
      shortDRX-Cycle               ENUMERATED           {
           sf2,                                          sf5, sf8, sf10, sf16, sf20,
           sf32,                                         sf40, sf64, sf80, sf128, sf160,
           sf256,                                        sf320, sf512, sf640},
      drxShortCycleTimer           INTEGER             (1..16)
    }        OPTIONAL                --                                  Need OR
  }
}

DRX-Config-v13xx ::=    SEQUENCE                       {
  ExtendedDRX           SEQUENCE                       {
    extendedDRX-Cycle            ENUMERATED              {sf2560, ... , sf10240, ...}
  }
}
```

EXTENDED DRX SETTING INFORMATION

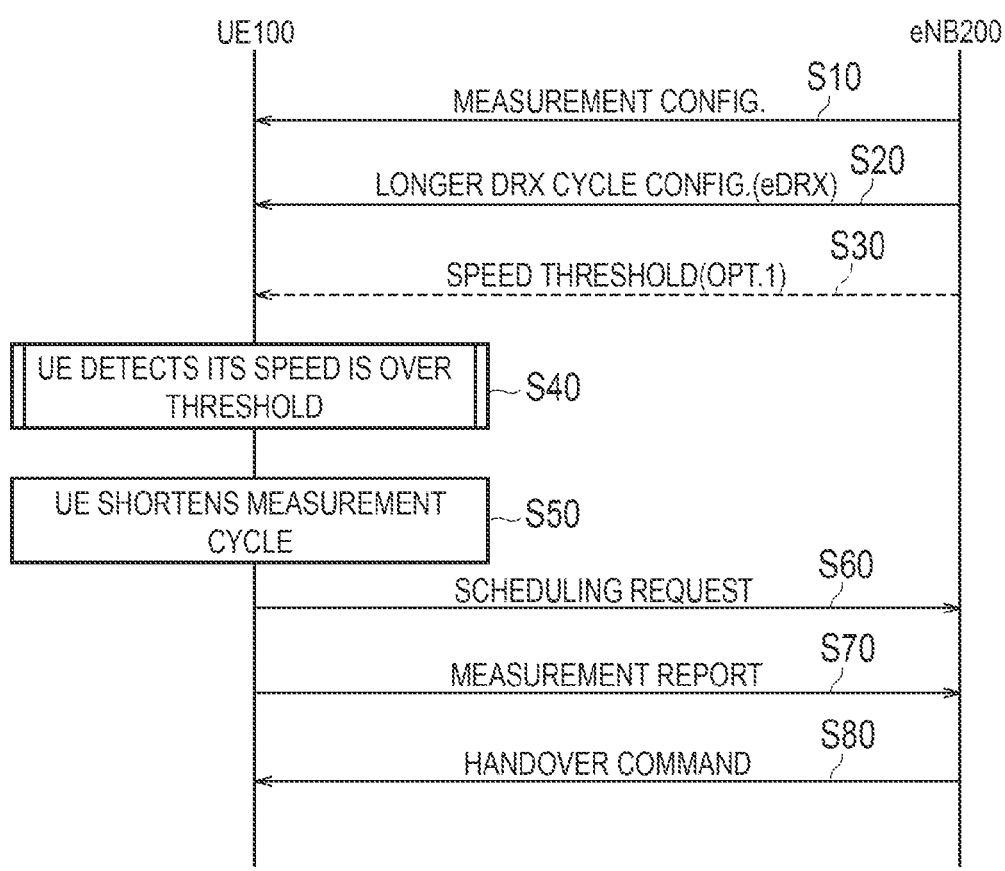

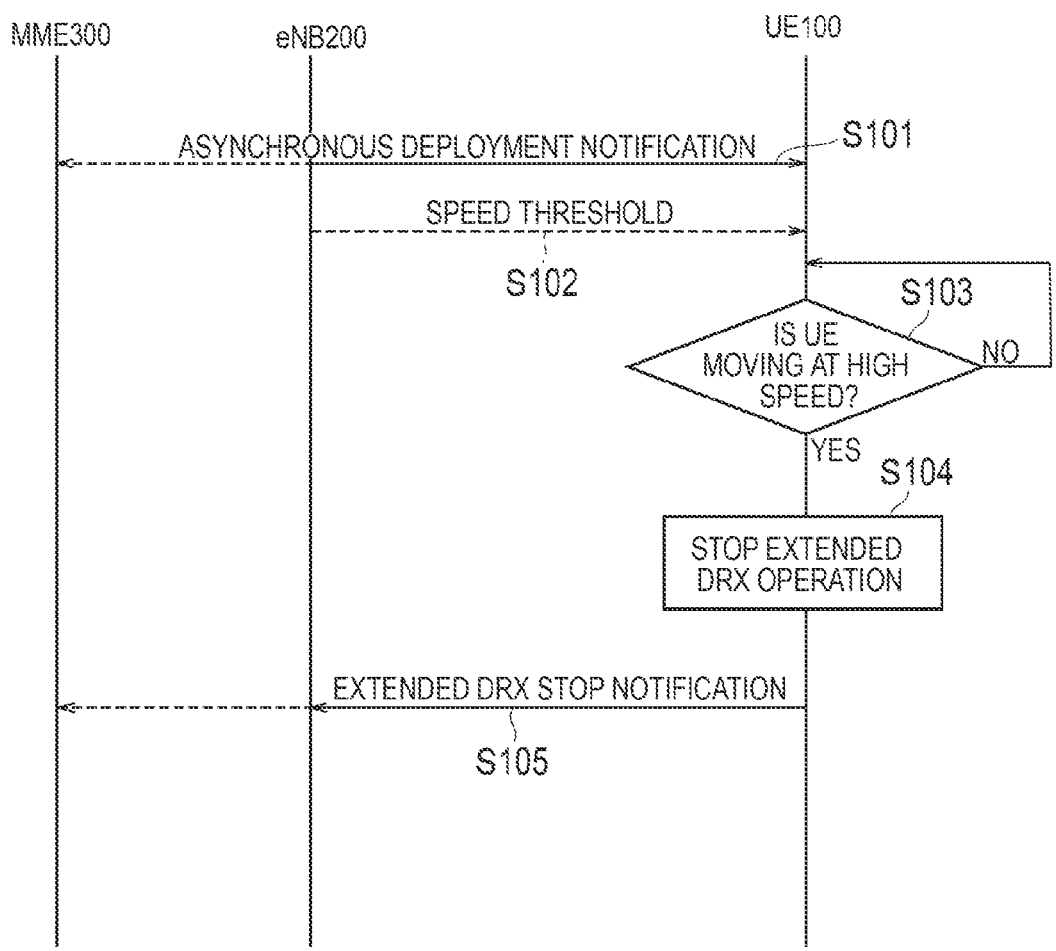

RADIO TERMINAL AND PROCESSOR FOR PERFORMING CONTROLS RELATED TO EXTENDED DISCONTINUOUS RECEPTION (DRX) OPERATION ACCORDING TO THE MOVING SPEED OF THE RADIO TERMINAL

CROSS REFERENCE

This application claims the benefit of U.S. provisional application No. 62/121,616 filed Feb. 27, 2015, and U.S. provisional application No. 62/162,204 filed May 15, 2015, the entire contents of which are incorporated herein by reference.

TECHNICAL FIELD

The prevent application relates to a user terminal and a processor used in a mobile communication system.

BACKGROUND ART

In the 3rd Generation Partnership Project (3GPP), which is a mobile communication system standardization project, discontinuous reception (DRX) is specified as an intermittent reception technique for reducing power consumption of a radio terminal. A radio terminal that performs the DRX operation intermittently monitors a downlink control channel. A cycle with which the downlink control channel is monitored is referred to as a "DRX cycle."

In recent years, machine type communication (MTC) in which a radio terminal performs communication in a mobile communication system with no human intervention has attracted attention. Under such a circumstance, a proposal to newly introduce an extended DRX cycle longer than an existing DRX cycle and further reduce the power consumption is under review. DRX using an extended DRX cycle is referred to as "extended DRX."

SUMMARY

A radio terminal according to an embodiment is used in a mobile communication system. The radio terminal includes: a controller configured to perform controls related to a DRX operation for intermittently monitoring a downlink control channel based on a comparison result of a value related to a moving speed of the radio terminal and a threshold value when the extended DRX operation is set from a network.

A processor according to an embodiment is configured to control a radio terminal of a mobile communication system. The processor is further configured to perform controls related to a DRX operation for intermittently monitoring a downlink control channel based on a comparison result of a value related to a moving speed of the radio terminal and a threshold value when the extended DRX operation is set from a network.

BRIEF DESCRIPTION OF DRAWINGS

FIG. 5 is a diagram illustrating an example of a DRX parameter in a connected mode;

FIG. 8 is a diagram illustrating an operation sequence according to the first embodiment;

FIG. 11 is a diagram illustrating an example of an operation sequence according to the second embodiment.

DESCRIPTION OF EMBODIMENTS

Overview of Embodiments

A radio terminal according to one embodiment is used in a mobile communication system. The radio terminal comprises a controller configured to performs control related to a DRX operation for intermittently monitoring a downlink control channel based on a comparison result of a value related to a moving speed of the radio terminal and a threshold value when the extended DRX operation is set from a network.

In one embodiment, a processor controls a radio terminal of a mobile communication system. The processor performs control related to a DRX operation for intermittently monitoring a downlink control channel based on a comparison result of a value related to a moving speed of the radio terminal and a threshold value when the extended DRX operation is set from a network.

In one embodiment, a radio terminal is used in a mobile communication system. The radio terminal is configured to prohibit a DRX operation for intermittently monitoring a downlink control channel when the extended DRX operation is set from a network, and the network is in an inter-cell asynchronous state.

In one embodiment, a processor is configured to control a radio terminal of a mobile communication system. The processor is further configured to prohibit a DRX operation for intermittently monitoring a downlink control channel when the extended DRX operation is set from a network, and the network is in an inter-cell asynchronous state.

First Embodiment (Mobile Communication System)

A LTE system, which is a mobile communication system, according to embodiments will be described below.

Figure 1:
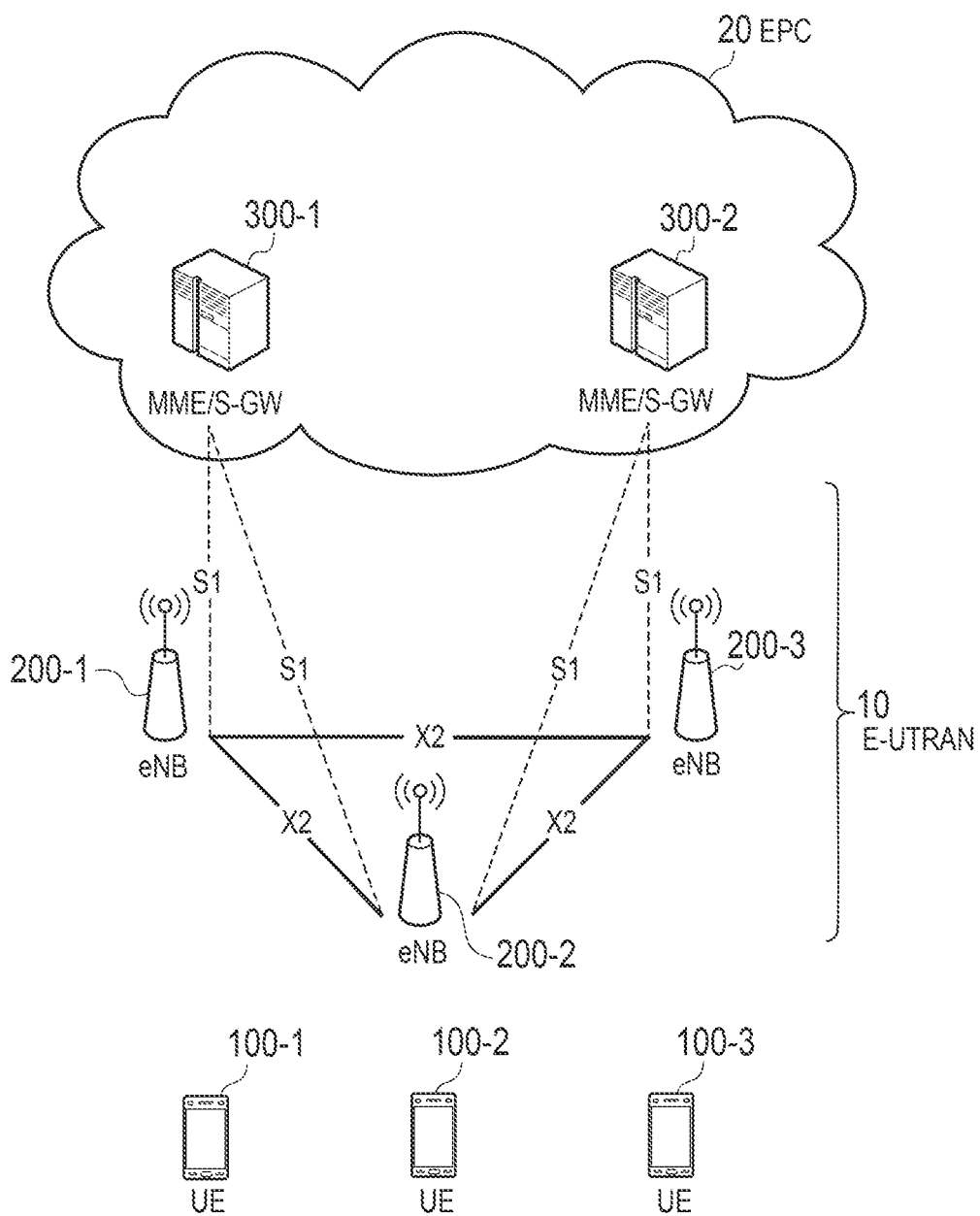
FIG. 1 is a configuration diagram illustrating an LTE system according to first and second embodiments.

FIG. 1 is a configuration diagram of the LTE system. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station.

The eNBs 200 are connected mutually via an X2 interface. Configuration of the eNB 200 will be described later.

The eNB 200 manages one or more cells and performs radio communication with the UE 100 which establishes a connection with a cell managed by the eNB 200 itself (cell of the eNB 200). The eNB 200 has a radio resource management (RRM) function, a routing function for user data (hereinafter simply referred to as "data"), and a measurement control function for mobility control and scheduling, and the like. It is noted that the "cell" is used as a term indicating a minimum unit of a radio communication area and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user. MME/S-GW 300 is connected to eNB 200 via an S1 interface. The E-UTRAN 10 and the EPC 20 constitute a network.

Figure 2:
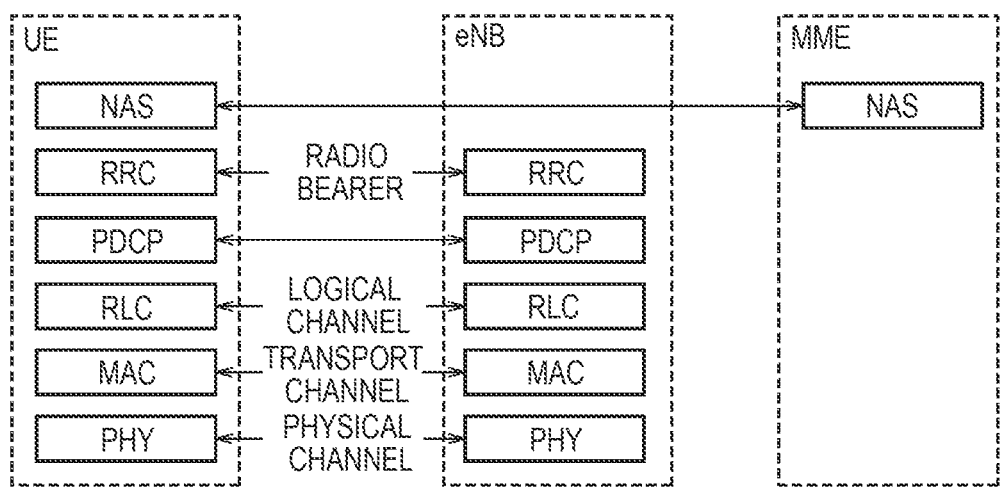
FIG. 2 is a protocol stack diagram of a radio interface according to the first and second embodiments.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), a random access procedure at the time of RRC connection establishment and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

Figure 3:
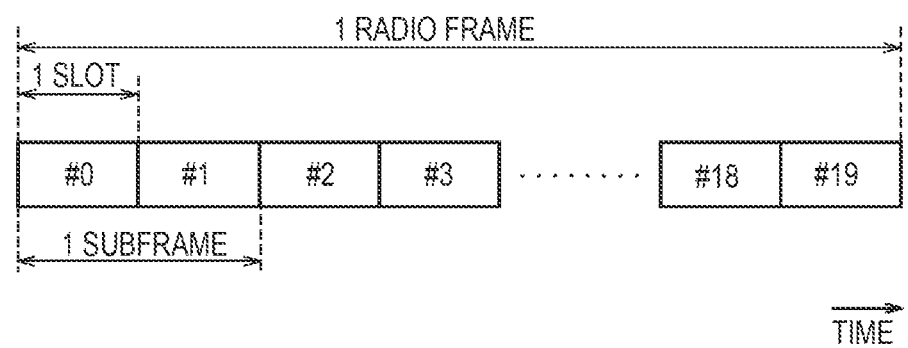
FIG. 3 is a configuration diagram illustrating a radio frame according to the first and second embodiments.

FIG. 3 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 3, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. One resource element (RE) is constituted by one symbol and one subcarrier. Moreover, among radio resources (time-frequency resources) assigned to the UE 100, a frequency resource is specified by a resource block and a time resource is specified by a subframe (or slot).

In the downlink, an interval of several symbols at the head of each subframe is a control region used as a physical downlink control channel (PDCCH) for mainly transmitting a downlink control signal. The detail of the PDCCH will be described later. Furthermore, the other interval of each subframe is a region available as a physical downlink shared channel (PDSCH) for mainly transmitting downlink data.

In the uplink, both ends in the frequency direction of each subframe are control regions used as a physical uplink control channel (PUCCH) for mainly transmitting an uplink control signal. The remaining portion of each subframe is a region available as a physical uplink shared channel (PUSCH) for mainly transmitting uplink data.

(DRX in Connected Mode)

Figure 4:
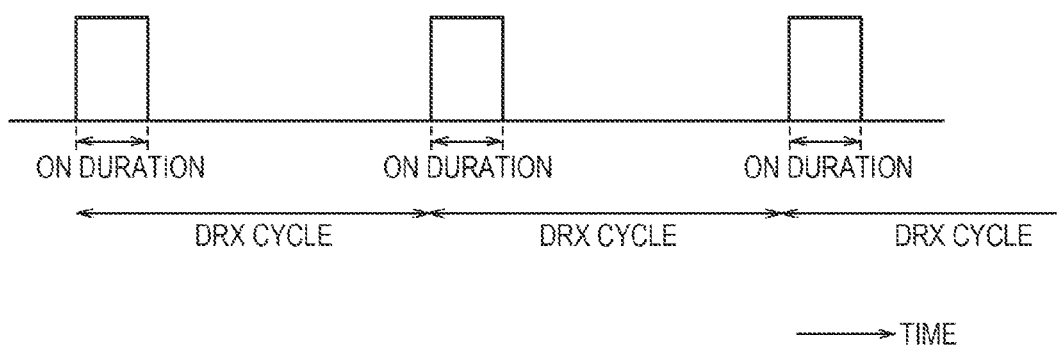
FIG. 4 is a diagram illustrating a DRX operation in a connected mode.

Next, DRX in a connected mode will be described. FIG. 4 is a diagram illustrating an operation of the UE 100 that performs a DRX operation in a connected mode. FIG. 5 is a diagram illustrating an example of a DRX parameter in the connected mode.

The UE 100 that performs the DRX operation in the connected mode intermittently monitors a PDCCH as illustrated in FIG. 4. A cycle with which the PDCCH is monitored is referred to as a "DRX cycle." A monitoring period occurring with the DRX cycle is referred to as an "ON duration." The "ON duration" is also referred to as a "wake-up period." A period in which the PDCCH needs not to be monitored is also referred to as a "sleep period" (or an "opportunity for DRX").

Downlink data is transmitted through a PDSCH, and scheduling information of the PDSCH is included in the PDCCH. The UE 100 can receive data designated by the scheduling information when the scheduling information is detected through the PDCCH in the "ON duration."

The existing DRX cycle includes a short DRX cycle and a long DRX cycle as illustrated in FIG. 5. The short DRX cycle and the long DRX cycle are the same in the "ON duration" but differ in the length of the sleep period. For example, the "ON duration" can be set to a period of 1 ms to 200 ms by an "ON duration timer." The long DRX cycle (and an OFF period) is set through "longDRX-CycleStartOffset," and the short DRX cycle is set through "shortDRX-Cycle." In the 3GPP specification, when the DRX is set, the long DRX is an essential function, but the short DRX is an optional function. Thus, even when the long DRX is set, the short DRX cycle may not be set in the UE 100.

The DRX is controlled by a plurality of timers to be described below:

"drx-InactivityTimer" the number of consecutive subframes (PDCCH subframes) after the PDCCH indicating scheduling of uplink (UL) or downlink (DL) user data is properly decoded.

"HARQ RTT Timer" a minimum of the number of subframes until DL HARQ retransmission is performed.

"drx-RetransmissionTimer" a period of time used for retransmission.

The UE 100 activates "drx-InactivityTimer" when new DL data is received during the "ON duration." At the same time, "HARQ RTT Timer" is activated. When the DL data is not properly decoded, "drx-RetransmissionTimer" is activated at the same time as when "HARQ RTT Timer" expires. The UE 100 receives retransmitted DL data, and stops "drx-RetransmissionTimer" when the DL data is properly decoded. Then, transition to the sleep period is performed at the same time as when "drx-InactivityTimer" expires.

A state in which "ON duration timer," "drx-Inactivity-Timer," and "drx-RetransmissionTimer" are being operated is referred to as an "active state." The UE 100 monitors the PDCCH in the "active state." A DRX operation other than the "active state" is referred to as an "inactive state."

Next, state transition between the short DRX operation (the state in which the short DRX cycle is used) and the long DRX operation (the state in which the long DRX cycle is used) will be described. Basically, the UE 100 starts from the short DRX, and transitions to the long DRX operation when a period of time set by "drxShortCycleTimer" elapses.

The UE 100 activates "drxShortCycleTimer" at a point in time at which the DL data is properly decoded. When new data is received during an operation of "drxShortCycleTimer," the UE 100 resumes "drxShortCycleTimer" at a point in time at which the data is properly decoded. On the other hand, when new data is not received until "drxShortCycleTimer" expires, state transition from the short DRX to the long DRX is performed. Then, when new data is received after transition to the long DRX is performed, state transition from the long DRX to the short DRX is performed again.

The setting information (the "ON duration," various kinds of timers, the long DRX cycle, the short DRX cycle, and the like) including the parameters of the DRX are set in the UE 100 through "DRX-Config" which is an information element in an individual RRC message.

In the first embodiment, in order to mainly support the machine type communication (MTC), the extended DRX cycle, which is longer than the existing DRX cycle, is newly introduced. In the example of FIG. 5, the extended DRX cycle has a duration of 2560 or more subframes.

The extended DRX is specified as an information element different from the existing "DRX-Config." In other words, "DRX-Config-v13xx" which is the setting information of the extended DRX is different from "DRX-Config" which is the setting information of the existing DRX. "DRX-Config-v13xx" may include the parameters such as the "ON duration" and various kinds of timers, separately from "DRX-Config."

(Measurement and Measurement Report in Connected Mode)

Next, measurement and a measurement report in the connected mode will be described.

The UE 100 in the connected mode performs measurement on a downlink reference signal of each cell (a cell-specific reference signal (CRS)) based on measurement setting information (Measurement Config) received from the eNB 200, and transmits a measurement report related to a measurement result to the eNB 200. The measurement result may include reference signal received power (RSRP), a reference signal received quality (RSRQ), and the like. The eNB 200 performs mobility control such as handover control based on the measurement report.

"Measurement Config" is an information element in an individual RRC message. "Measurement Config" includes report setting information (ReportConfig), a measurement object (MeasObject), and a measurement identifier (MeasId). "ReportConfig" is used to set a condition under which the "measurement report" is transmitted from the UE 100 to the eNB 200. For example, according to a condition specified in Event-A3, the "measurement report" is transmitted when a measurement result for a neighboring cell is better than a measurement result for a current serving cell by an offset value or more. According to a condition specified in Event-A4, the "measurement report" is transmitted when a measurement result for a neighboring cell is better than a predetermined threshold value. According to a condition specified in Event-A2, the "measurement report" is transmitted when a measurement result for a current serving cell is a predetermined threshold value or less. According to a condition specified in "Periodical," the "measurement report" is transmitted with a predetermined report cycle. "ReportConfig" may be used to set an offset value, a predetermined threshold value, a predetermined report cycle, the number of reports, a type of report condition, and the like.

"MeasObject" is used to set a frequency and/or a radio access technology (RAT), which is regarded as the measurement object by the UE 100. "MeasId" is used to associate one "ReportConfig" with one "MeasObject." The UE 100 measures the measurement object designated by "MeasObject" corresponding to "MeasId" and transmits the "measurement report" to the eNB 200 when a condition designated by "ReportConfig" corresponding to "MeasObject" is satisfied by "MeasId".

In order to suppress an increase in the power consumption, it is desirable that the UE 100 that performs the DRX operation perform the measurement only during the ON duration (or in the active state), specifically, an intra-frequency measurement. The "intra-frequency" measurement is a measurement in the same frequency as in the serving cell. Hereinafter, the UE 100 is assumed to perform the "intra-frequency" measurement only during the ON duration (in the active state).

When the extended DRX is introduced, the UE 100 may perform the "intra-frequency" measurement with a very long measurement cycle. When the "intra-frequency" measurement is performed only during the ON duration (in the active state), the measurement cycle is the same cycle (a duration of 2560 or more subframes) as the extended DRX cycle.

(Radio Terminal)

Figure 6:
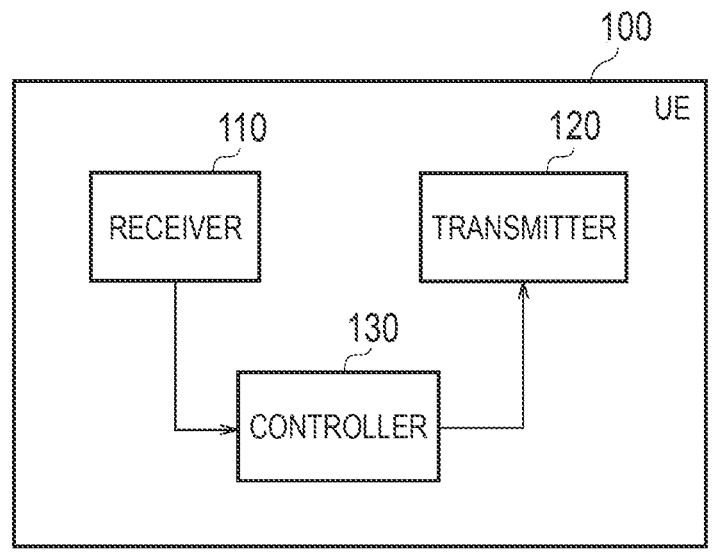
FIG. 6 is a block diagram illustrating a UE according to the first and second embodiments.

Next, the UE 100 (radio terminal) according to the first embodiment will be described. FIG. 6 is a block diagram illustrating a configuration of the UE 100. The UE 100 includes a receiver 110, a transmitter 120, and a controller 130 as illustrated in FIG. 6.

The receiver 110 performs various kinds of receptions under control of the controller 130. The receiver 110 includes an antenna and a receiver. The receiver converts a radio signal received through the antenna into a baseband signal (a reception signal), and outputs the baseband signal to the controller 130.

The transmitter 120 performs various kinds of transmissions under control of the controller 130. The transmitter 120 includes an antenna and a transmitter. The transmitter converts a baseband signal (a transmission signal) output from the controller 130 into a radio signal, and transmits the radio signal through the antenna.

The controller 130 performs various kinds of controls in the UE 100. The controller 130 includes a processor and a memory. The memory stores a program executed through the processor and information used for a process by the processor. The processor includes a baseband processor that performs, for example, modulation/demodulation and encoding/decoding on the baseband signal and a Central Processing Unit (CPU) that performs various kinds of processes by executing the program stored in the memory. The processor may include a codec that performs encoding/decoding on an audio/video signal. The processor executes various kinds of processes and various kinds of communication protocols which will be described later.

In the UE 100 having the above-described configuration, when the extended DRX operation (the extended DRX operation in the connected mode) is performed in the cell of the eNB 200, the controller 130 performs measurement on the downlink reference signal with a predetermined measurement cycle based on "Measurement Config" received from the eNB 200. A predetermined measurement cycle is determined according to the DRX cycle (the extended DRX cycle) in the extended DRX operation. For example, a predetermined measurement cycle is equivalent to the extended DRX cycle.

When a value related to a moving speed of the UE 100 exceeds a threshold value, the controller 130 changes the measurement cycle to a measurement cycle shorter than a predetermined measurement cycle, for example, a measurement cycle shorter than the extended DRX cycle. In other words, the frequency of the "intra-frequency" measurement is increased by changing the measurement cycle to a measurement cycle shorter than before the value related to the moving speed of the UE 100 exceeds a threshold value.

When the UE 100 includes a GPS receiver, the value related to the moving speed of the UE 100 is a moving speed obtained using the GPS receiver. Alternatively, when the UE 100 includes an acceleration sensor, the value related to the moving speed of the UE 100 may be acceleration or a moving speed obtained using the acceleration sensor. Alternatively, the value related to the moving speed of the UE 100 may be the number of cell migrations per unit time (for example, the number of handovers).

The threshold value that is to be compared with the value related to the moving speed of the UE 100 may be either a threshold value designated from the eNB 200 or a threshold value that is set in advance. Alternatively, a value of the DRX cycle may be used as the threshold value. The threshold value may also be based on at least one of cell size information indicating the size of the cell (the serving cell) and a measurement value obtained by the measurement. Hereinafter, the threshold value is referred to as a "moving speed threshold value."

(Base Station)

Figure 7:
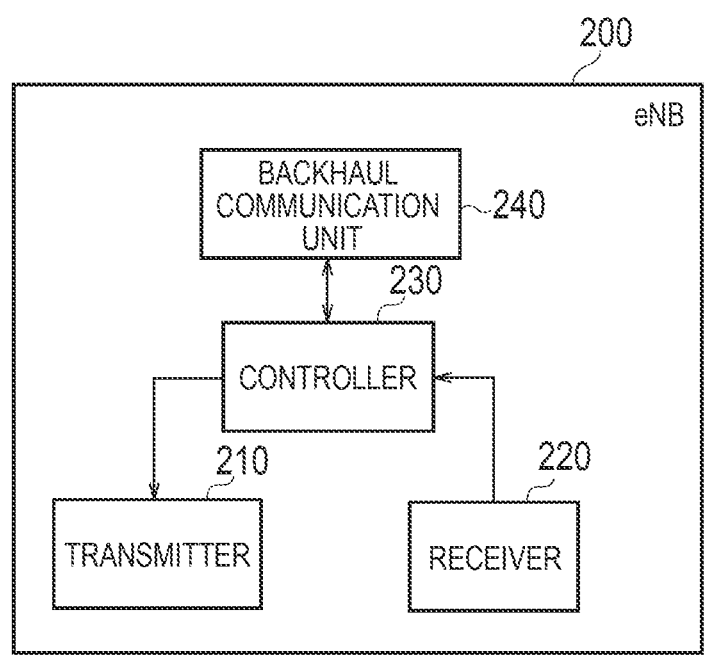
FIG. 7 is a block diagram illustrating an eNB according to the first and second embodiments.

Next, a configuration of the eNB 200 (the base station) according to the first embodiment will be described. FIG. 7 is a block diagram illustrating the eNB 200. As illustrated in FIG. 7, the eNB 200 includes a transmitter 210, a receiver 220, a controller 230, and a backhaul communication unit 240.

The transmitter 210 performs various kinds of transmissions under control of the controller 230. The transmitter 210 includes an antenna and a transmitter. The transmitter converts a baseband signal (a transmission signal) output from the controller 230 into a radio signal, and transmits the radio signal through the antenna.

The receiver 220 performs various kinds of receptions under control of the controller 230. The receiver 220 includes an antenna and a receiver. The receiver converts a radio signal received through the antenna into a baseband signal (a reception signal), and outputs the baseband signal to the controller 230.

The controller 230 performs various kinds of control in the eNB 200. The controller 230 includes a processor and a memory. The memory stores a program executed through the processor and information used for a process by the processor. The processor includes a baseband processor that performs, for example, modulation/demodulation and encoding/decoding on the baseband signal and a Central Processing Unit (CPU) that performs various kinds of processes by executing the program stored in the memory. The processor executes various kinds of processes and various kinds of communication protocols which will be described later.

The backhaul communication unit 240 is connected with the neighboring eNB 200 through the X2 interface and connected with the MME/S-GW 300 through the S1 interface. The backhaul communication unit 240 is used for communication performed on the X2 interface, communication performed on the S1 interface, and the like.

(Operation Sequence)

Next, an operation sequence according to the first embodiment will be described. FIG. 8 is a diagram illustrating an operation sequence according to the first embodiment. The UE 100 is in the connected mode in the cell of the eNB 200.

As illustrated in FIG. 8, in step S10, the transmitter 210 of the eNB 200 transmits "Measurement Config" to the UE 100. The receiver 110 of the UE 100 receives "Measurement Config." The controller 130 of the UE 100 holds "Measurement Config" and starts the measurement based on "Measurement Config".

In step S20, the transmitter 210 of the eNB 200 transmits the setting information of the extended DRX (herein referred to as "eDRX Config") to the UE 100. The receiver 110 of the UE 100 receives "eDRX Config." The controller 130 of the UE 100 holds "eDRX Config" and transitions to the extended DRX operation based on "eDRX Config". The controller 130 of the UE 100 performs the "intra-frequency" measurement with a predetermined measurement cycle decided according to the extended DRX cycle.

Step S20 may be performed before step S10. Alternatively, steps S10 and S20 may be performed at the same time. In this case, "Measurement Config" and "eDRX Config" may be transmitted to the UE 100 through one individual RRC message. The individual RRC message may be a "RRC connection release."

In step S30, the transmitter 210 of the eNB 200 transmits threshold value information indicating the moving speed threshold value to the UE 100. The receiver 110 of the UE 100 receives the threshold value information. The controller 130 of the UE 100 sets the moving speed the threshold value according to the threshold value information. However, step S30 is not essential and may be omitted.

The threshold value information may be transmitted through a broadcast RRC message (SIB) as a kind of system information. Alternatively, the threshold value information may be transmitted through the individual RRC message. In this case, the threshold value information may be transmitted in step S10 or step S20.

In step S40, the controller 130 of the UE 100 determines whether or not the value related to the moving speed of the UE 100 exceeds the moving speed threshold value, and detects that the value related to the moving speed of the UE 100 exceeds the moving speed threshold value.

In step S50, the controller 130 of the UE 100 changes the measurement cycle to a measurement cycle that is shorter than the predetermined measurement cycle decided according to the extended DRX cycle. In other words, the controller 130 of the UE 100 increases the frequency of the "intra-frequency" measurement by changing the measurement cycle to a measurement cycle shorter than the measurement cycle before step S40.

The controller 130 of the UE 100 determines whether or not the report condition, which indicates the condition under which the "measurement report" is transmitted to the eNB 200, is satisfied as a result of the measurement. As described above, the report condition is designated by "ReportConfig" in "Measurement Config." Here, the description will proceed under the assumption that the report condition is satisfied.

In step S60, the transmitter 120 of the UE 100 transmits a scheduling request to the eNB 200 to be allocated uplink radio resources used for transmitting the "measurement report." The receiver 220 of the eNB 200 receives "Scheduling Request."

The controller 130 of the UE 100 stops the extended DRX operation after transmitting the "scheduling request" to the eNB 200. The controller 130 of the UE 100 may transition to a predetermined DRX operation, which has a DRX cycle that is shorter than the extended DRX operation, when the extended DRX operation is stopped. A predetermined DRX operation may be, for example, the long DRX operation or the short DRX operation.

The controller 230 of the eNB 200 allocates the uplink radio resources to the UE 100 when the "scheduling request" is received. The transmitter 210 of the eNB 200 transmits scheduling information (a UL grant) indicating the allocated resources to the UE 100. The receiver 110 of the UE 100 receives the "UL grant."

In step S70, the transmitter 120 of the UE 100 transmits the "measurement report" to the eNB 200. The receiver 220 of the eNB 200 receives the "measurement report." The controller 230 of the eNB 200 determines whether or not to the UE 100 performs a handover to another cell based on the "measurement report." Here, the description will proceed under the assumption that the UE 100 is determined to perform a handover to another cell.

In step S80, the transmitter 210 of the eNB 200 transmits a handover command to perform a handover to another cell to the UE 100. The receiver 110 of the UE 100 receives the "handover command." The controller 130 of the UE 100 performs a handover to another cell based on the "handover command."

Conclusion of First Embodiment

When the value related to the moving speed of the UE 100 exceeds the moving speed threshold value, the UE 100 that performs the extended DRX operation in the connected mode changes the measurement cycle to a measurement cycle shorter than a predetermined measurement cycle (for example, a measurement cycle shorter than the extended DRX cycle).

In the first embodiment, the UE 100 changes the measurement cycle to a measurement cycle shorter than a predetermined measurement cycle determined according to the extended DRX cycle. In other words, the UE 100 performs the "intra-frequency" measurement in a period of time other than the "ON duration" (the active state).

Thus, even when the UE 100 that is performing the extended DRX operation moves, appropriate mobility control can be implemented.

In the first embodiment, the UE 100 sets the moving speed threshold value based on the threshold value information received from the eNB 200. Accordingly, the moving speed threshold value can be made different for each eNB 200 (or for each cell). Thus, an optimal moving speed threshold value can be set according to the coverage size of the eNB 200 (or cell).

First Modified Example of First Embodiment

The first embodiment as described above provides an example in which the moving speed threshold value is set based upon the threshold value information received from the eNB 200 by the UE 100, and it is determined whether or not the moving speed of the UE 100 exceeds the moving speed threshold value.

Figure 9A:
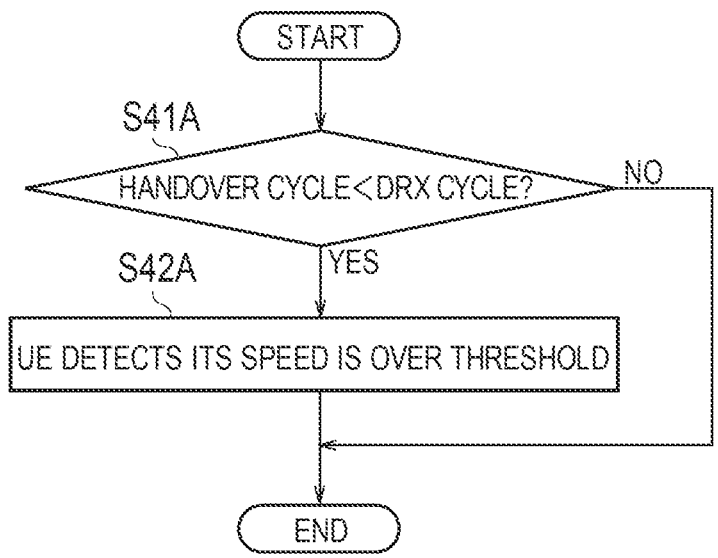
FIGS. 9A and 9B are flowcharts illustrating a moving speed determination method according to a first modified example of the first embodiment.

In the present modified example, another example of the moving speed determination method (step S40 of FIG. 8) will be described. FIG. 9A is a flowchart illustrating a first moving speed determination method according to the present modified example. The first moving speed determination method is a method of setting the moving speed threshold value based on the DRX cycle.

As illustrated in FIG. 9A, in step S41A, the controller 130 of the UE 100 compares a handover cycle serving as the number of handovers per unit time with the DRX cycle (that is, the extended DRX cycle) that is currently used. Here, the "handover cycle" corresponds to the value related to the moving speed of the UE 100.

When the DRX cycle is larger than the "handover cycle" (Yes in step S41A), then in step S42A, the controller 130 of the UE 100 detects that the value related to the moving speed of the UE 100 exceeds the moving speed threshold value.

Figure 9B:
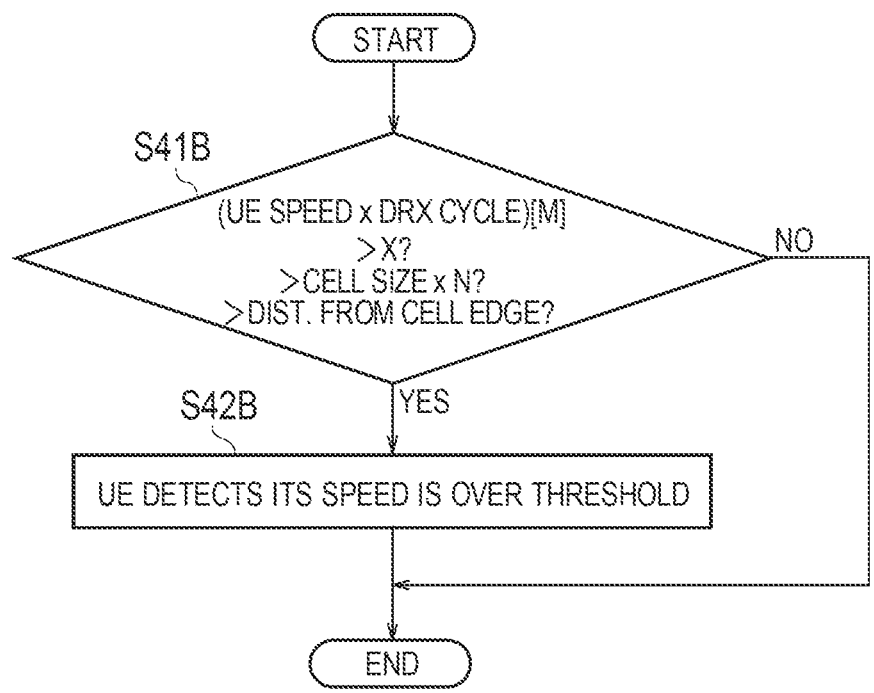

FIG. 9B is a flowchart illustrating a second moving speed determination method according to the present modified example. The second moving speed determination method is a method of setting the moving speed threshold value based on at least one of the cell size information indicating the size of the serving cell and the measurement value obtained by the measurement.

As illustrated in FIG. 9B, in step S41B, the controller 130 of the UE 100 compares a value obtained by multiplying the moving speed of the UE 100 by the DRX cycle (that is, the extended DRX cycle) that is currently used with the moving speed threshold value. The value obtained by the multiplication corresponds to a moving distance per DRX cycle. The moving speed threshold value is set based on the size of the serving cell or the measurement value (the RSRP/RSRQ measurement value). The cell size information is transmitted from, for example, the serving cell. A value obtained by multiplying the cell size information by a predetermined coefficient (N) may be used as the moving speed threshold value. It is possible to estimate a distance to the cell edge based on the RSRP/RSRQ measurement value, and the distance to the cell edge is used as the moving speed threshold value. Alternatively, a value (X) that is set in advance may be set as the moving speed threshold value.

When "Yes" is determined in step S41B, then in step S42B, the controller 130 of the UE 100 detects that the value related to the moving speed of the UE 100 exceeds the moving speed threshold value.

As described above, according to the present modified example, the measurement cycle can be reduced under the circumstances in which the moving speed of the UE 100 is regarded to be high in view of the DRX cycle that is currently used.

Second Modified Example of First Embodiment

In the present modified example, the controller 130 of the UE 100 changes the report condition (ReportConfig) according to the value related to the moving speed of the UE 100. Specifically, the report condition is relieved, and the report condition (ReportConfig) is changed so that transmission of the "measurement report" is rapidly performed.

For example, when the moving speed is high, a Time To Trigger (TTT) is set to be short, and when the moving speed is slow, the TTT is set to be long. The TTT is a duration in which a specific trigger condition (an event condition) is satisfied. By using the controls as described above, a minimum number of measurements can be performed. Thus, even when the measurement cycle is reduced, an increase in the power consumption of the UE 100 can be suppressed.

A variable range ($\alpha$) of the trigger condition may be set from the eNB 200. For example, when TTT±$\alpha$ [sec] designated by "ReportConfig" is set, the UE 100 varies $\alpha$ [sec] according to its moving speed. Alternatively, upper and lower limits of the trigger condition may be designated by the eNB 200.

Third Modified Example of First Embodiment

In the present modified example, the controller 130 of the UE 100 gives a notification indicating that the extended DRX operation is stopped to the eNB 200 by transmitting a special buffer state report to the eNB 200 after transmitting the "scheduling request" (step S60 of FIG. 8). The special buffer state report is, for example, a buffer state report indicating that a buffered amount is zero.

The receiver 220 of the eNB 200 receives the special buffer state report. The eNB 200 can detect that the UE 100 stops the extended DRX operation based on the special buffer state report.

Fourth Modified Example of First Embodiment

In the first embodiment, the UE 100 transmits the "scheduling request" to the eNB 200 (step S60 of FIG. 8). However, in a state in which uplink timing synchronization is not maintained, a random access preamble may be transmitted to the eNB 200 instead of the "scheduling request". For example, uplink timing synchronization is not maintained when a time alignment timer does not expire.

The eNB 200 transmits a timing advance to the UE 100 together with the uplink scheduling information as the random access preamble is received. The UE 100 may transmit connection request message to the eNB 200 as the uplink scheduling information is received. The connection request message is, for example, a "RRC connection request" message. However, when the RRC connection is maintained, the UE 100 may not transmit the "RRC connection request" message.

Here, the UE 100 may give a notification indicating that the extended DRX operation is stopped to the eNB 200 by transmitting a special connection request message to the eNB 200. The special connection request message is, for example, a "RRC connection request" message including a flag indicating that the extended DRX operation is stopped (that is, transition to the long DRX operation is performed).

Alternatively, the UE 100 may transmit a special random access preamble different from a normal random access preamble as the special connection request message. In this case, when a preamble is transmitted using a predetermined sequence (a signal sequence) in Msg1 of a random access procedure, it can indicate that the extended DRX is stopped. Alternatively, in information (for example, a MAC control element) transmitted through Msg3 in the random access procedure, a notification of information indicating that the extended DRX is stopped may be given.

Alternatively, instead of the "RRC connection request," a "RRC connection reestablishment request" may be used.

Fifth Modified Example of First Embodiment

The first embodiment has been described in connection with the example in which the UE 100 transmits the "scheduling request" to the eNB 200 and transitions from the extended DRX operation to the long DRX operation.

In the present modified example, the UE 100 holds a first DRX setting information (eDRX-Config) including a first DRX parameter for the extended DRX operation and a second DRX setting information (DRX-Config) including a second DRX parameter for the long DRX operation. The UE 100 applies a combination of a part of the first DRX parameter and a part of the second DRX parameter to the long DRX operation.

For example, eDRX-Config is compared with DRX-Config, and the DRX parameter leading to power saving is selected.

Firstly, a smaller setting value is used for "On Duration Timer."

Secondly, a smaller setting value is used for "Inactivity Timer."

Thirdly, a smaller setting is used for "Retransmission Timer."

The long DRX cycle in "DRX-Config" is used for the DRX cycle.

Such a setting may be valid only in a certain period of time. In this case, the certain period of time may be designated by the eNB 200.

Other Modified Examples of First Embodiment

The UE 100 may continuously perform the extended DRX operation even when the "scheduling request" or the random access preamble is transmitted to the eNB 200. In this case, a similar method to that of the fifth modified example may be applied to the extended DRX operation.

The above embodiment has been described focusing on the "intra-frequency" measurement. However, the present invention may be applied to inter-frequency measurement. "Measurement Config" includes "gapOffset" for a measurement gap of the "inter-frequency" measurement. When "gp0" is set in "gapOffset," the cycle of the measurement gap is "40 ms," and when "gp1" is set in "gapOffset," the cycle of the measurement gap is "80 ms." When the extended DRX is introduced, a new "gapOffset" is assumed to be introduced for the extended DRX. When such a long "gapOffset" is set, the UE 100 changes the measurement cycle to a measurement cycle shorter than a gap cycle indicated by "gapOffset" when the value related to the moving speed of the UE 100 exceeds the moving speed threshold value. Accordingly, even when the UE 100 that performs the extended DRX operation moves, appropriate mobility control can be implemented.

Second Embodiment

A second embodiment will be described below focusing on the differences with the first embodiment. In the first embodiment, the DRX operation in the connected mode is mainly assumed.

On the other hand, the second embodiment can be applied to the DRX operation in the idle mode as well as the DRX operation in the connected mode. In the DRX operation in the idle mode, the DRX cycle is referred to as a "paging cycle." The UE 100 that performs the DRX operation in the idle mode intermittently monitors the PDCCH for receiving a paging message. In the DRX operation in the idle mode, the eNB 200 can set the DRX operation to the UE 100, and the MME 300 can set the DRX operation to the UE 100 as well.

The UE 100 according to the second embodiment stops the extended DRX operation when the value related to the moving speed of the UE 100 exceeds a threshold value. A method of acquiring the value related to the moving speed of the UE 100 and a method of setting the threshold value are similar to those in the first embodiment. The UE 100 may transmit information indicating whether or not the extended DRX operation is stopped to a network.

In the second embodiment, the UE 100 may stop the extended DRX operation when the value related to the moving speed of the UE 100 exceeds a threshold value under the circumstances in which a network is in an inter-cell asynchronous state (asynchronous deployment).

In the second embodiment, the UE 100 acquires information indicating that the network is in the inter-cell asynchronous state from the network. Alternatively, the UE 100 may perform measurement on the radio signal and autonomously determine whether or not the network is in the inter-cell asynchronous state.

(Example of Operation Environment)

Figure 10:
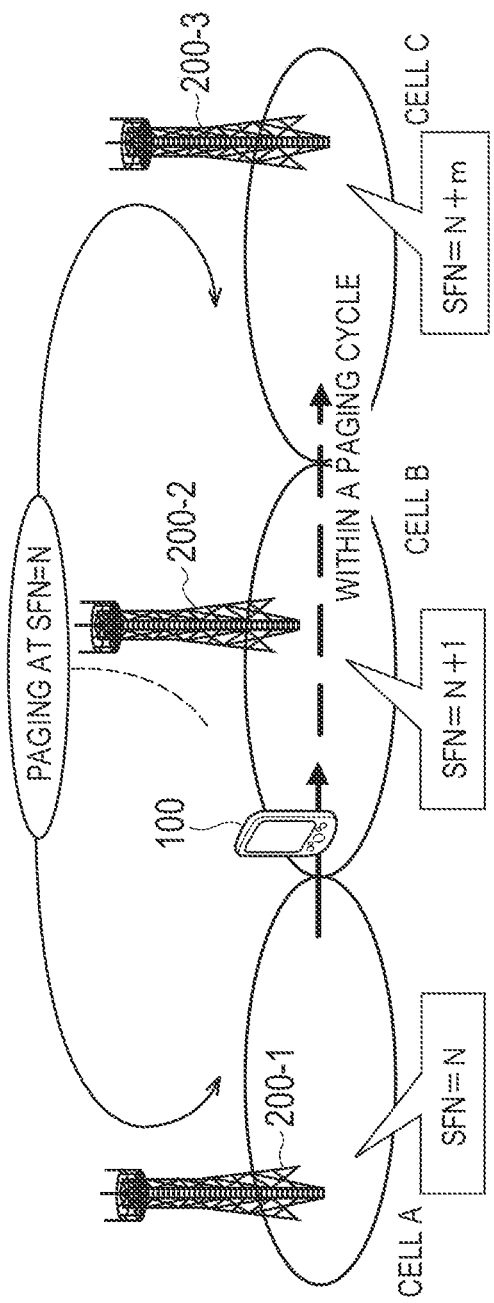
FIG. 10 is a diagram illustrating an example of an operation environment according to the second embodiment.

FIG. 10 is a diagram illustrating an example of an operation environment according to the second embodiment. Here, the DRX operation in the idle mode is assumed.

An eNB 200-1 manages a cell A, an eNB 200-2 manages a cell B, and an eNB 200-3 manages a cell C as illustrated in FIG. 10. The cells A, B, and C belong to the same tracking area (TA). The cells A and B are adjacent to each other, and the cells B and C are adjacent to each other.

The cells A, B, and C are in the inter-cell asynchronous state (asynchronous deployment). In the example of FIG. 10, a system frame number (SFN) of the cell B is SFN+1 of the cell A. The SFN of the cell C is SFN+m of the cell A (m≥2).

The UE 100 moves from the cell A to the cell B and then moves from the cell B to the cell C. Here, when the UE 100 exists in the cell B, each cell transmits a paging message destined for the UE 100 at the SFN=N. However, at this point in time, since the SFN of the cell B is N+1, the cell B may not transmit the paging message until the SFN of the cell B becomes N again. For this reason, the UE 100 is unable to receive the paging message for a long time in the cell B. The same problem may arise even when the UE 100 moves to the cell C. Particularly, since the DRX cycle (the paging cycle) of the extended DRX is very long, a severe problem may arise.

In this regard, the UE 100 according to the second embodiment stops the extended DRX operation when the value related to the moving speed of the UE 100 exceeds a threshold value under the circumstances in which the network is in the inter-cell asynchronous state. The UE 100 may transmit the information indicating whether or not the extended DRX operation to the eNB 200 or the MME 300.

(Example of Operation Sequence)

FIG. 11 is a diagram illustrating an example of an operation sequence according to the second embodiment. Here, the DRX operation in the idle mode is mainly assumed.

As illustrated in FIG. 11, in step S101, when the cell of the eNB 200 and another cell are in the inter-cell asynchronous state, the eNB 200 transmits a notification indicating the inter-cell asynchronous state (an asynchronous deployment notification) to the UE 100 in the cell. The "asynchronous deployment" notification is transmitted through the SIB in a broadcast manner. Alternatively, the "asynchronous deployment" notification may be transmitted to the UE 100 through individual RRC signaling or the like. The UE 100 detects the cell (the serving cell) in which the UE 100 camps (exists) is in the "asynchronous deployment" based on the "asynchronous deployment" notification. The eNB 200 may transmit the "asynchronous deployment" notification to the MME 300.

Alternatively, the UE 100 may perform measurement the radio signals of the serving cell and the neighboring cell adjacent to the serving cell and autonomously determine whether or not the serving cell and the neighboring cell are in the inter-cell asynchronous state. For example, the UE 100 may determine whether or not the serving cell and the neighboring cell are in the synchronous state, that is, whether or not the serving cell and the neighboring cell are in the inter-cell asynchronous state based on "systemFrameNumber" included in master information blocks (MIB) of the serving cell and the neighboring cell. For example, the UE 100 may determine that the serving cell and the neighboring cell are in the synchronous state when "systemFrameNumber" included in the MIB of the serving cell received at the time of synchronization of the UE 100 is identical to "systemFrameNumber" included in the MIB of the neighboring cell, and may determine that the serving cell and the neighboring cell are in the asynchronous state when "systemFrameNumber" included in the MIB of the serving cell is not identical to "systemFrameNumber" included in the MIB of the neighboring cell. When the UE 100 autonomously determines whether or not the serving cell and the neighboring cell are in the inter-cell asynchronous state, step S101 may be omitted.

In step S102, the eNB 200 transmits threshold value information indicating a threshold value (a speed threshold) of the moving speed to the UE 100. Similarly to the first embodiment, the "speed threshold" may be a value in which a cell size (a distance between sites) is considered. However, when the "speed threshold" is set in the UE 100 in advance, step S102 is not essential and may be omitted.

In step S103, the UE 100 compares the value related to the moving speed of the UE 100 with the "speed threshold" and determines whether or not the UE 100 is moving at a high speed. When the value related to the moving speed of the UE 100 exceeds the "speed threshold," the UE 100 determines that the UE 100 is moving at a high speed (YES in step S103), and causes the process to proceed to step S104. On the other hand, when the value related to the moving speed of the UE 100 does not exceed the "speed threshold," the UE 100 determines that the UE 100 is not moving at a high speed (NO in step S103), and executes the process of step S103 again after a certain period of time. Further, when the UE 100 is determined not to be moving at a high speed (NO in step S103), the UE 100 may not execute the process of step S103 again.

In step S104, the UE 100 stops (prohibits) the extended DRX operation. Specifically, even when the UE 100 holds the setting information of the extended DRX operation, the setting information is not applied (that is, the setting information is invalidated). Here, the UE 100 does not apply the setting information of the extended DRX operation even when the UE 100 is not performing the extended DRX operation. When the UE 100 holds the setting information of the normal DRX operation in addition to the setting information of the extended DRX operation, switching from the extended DRX operation to the normal DRX operation may be performed.

In step S105, the UE 100 transmits a notification indicating that the extended DRX operation is stopped (an extended DRX stop notification) to the eNB 200. The extended DRX stop notification may be regarded as a notification indicating that the UE 100 is moving at a high speed. It is desirable that the eNB 200 that has received the notification do not set the extended DRX operation in the connected mode to the UE 100.

The UE 100 may transmit the extended DRX stop notification to the eNB 200 through a "UE assistance information" message. The eNB 200 may transfer the extended DRX stop notification received from the UE 100 to the MME 300. Alternatively, the UE 100 may transmit the extended DRX stop notification to the MME 300 through NAS signaling.

It is desirable that the MME 300 that has received the "asynchronous deployment" notification or the extended DRX stop notification does not set the extended DRX to the UE 100 through by the NAS signaling.

In this sequence, the operation in which the UE 100 stops the extended DRX operation has been described. However, when the moving speed of the UE 100 is reduced, the UE 100 may start the extended DRX operation (that is, validate the setting information of the extended DRX operation). In this case, the UE 100 may transmit a notification indicating that the extended DRX operation starts to the eNB 200 and/or the MME 300.

The above embodiment is under the assumption that the UE 100 holds the setting information of the extended DRX operation, but the present invention is not limited thereto, and when the UE 100 does not hold the setting information of the extended DRX operation (when the notification of the setting information of the extended DRX operation is not given to the UE 100), if the extended DRX stop notification is received from the UE 100, the eNB 200 may not give the notification of the setting information of the extended DRX operation to the UE 100.

Other Embodiments

The eNB 200 may not give the notification of the extended DRX setting information to the UE 100 when the cell is in the inter-cell asynchronous state.

In the above embodiments, the condition under which the value related to the moving speed of the UE 100 exceeds a threshold value is used as the condition under which the UE 100 stops the extended DRX operation, but the present invention is not limited thereto, and even when the value related to the moving speed of the UE 100 does not exceed the threshold value, the extended DRX operation may be stopped if the serving cell and the neighboring cell are in the inter-cell asynchronous state.

The first and second embodiments are not limited to the example in which they are carried out separately and independently, and the first and second embodiments may be combined with each other and carried out.

In the above embodiments, the LTE system has been described as an example of a mobile communication system. However, the present invention is not limited to the LTE system. The present invention may be applied to a system other than the LTE system.

[Appendix]

Below, additional items of the aforementioned embodiments will be described.

(1. Introduction)

In TSG-RAN#67, the new work item on RAN enhancements for extended DRX in LTE was approved. The objective of the work item is to provide the RAN specifications for both Idle and Connected UEs with extended DRX cycle as follows;

Extend idle mode DRX cycles in order to provide at least an order of magnitude power savings for UEs in idle mode Extend connected mode DRX cycles in order to enable additional power savings beyond what is currently possible for UEs in connected mode In advance of the work items start, RAN2 was informed of three issues from SA2 as outcomes of on-going relevant study, and it was concluded that RAN2 may reply individually for UMTS and LTE from the respective sessions;

Issue 1:

Given a maximum response time desired by UE/applications, how to derive the eDRX value taking RAN/GERAN aspects into account (e.g. possible paging misses due to lack of SFN or frame timing alignment between cells, etc.).

Issue 2:

How to maintain level of reliability for UE being able to receive the paging at its paging occasion similar to paging reliability for normal DRX, even when UE has performed cell reselection.

Issue 3:

Impact on idle mode UE measurement and cell reselection

In this description, the analysis of the three issues is provided.

(2. Discussion)

(2.1. Issue 1)

The issue 1 is as follows;

Issue 1:

Given a maximum response time desired by UE/applications, how to derive the eDRX value taking RAN/GERAN aspects into account (e.g. possible paging misses due to lack of SFN or frame timing alignment between cells, etc.).

Idle mode case;

The maximum response time (or the maximum latency time) is studied in SA2 to facilitate 3GPP systems to support various types of MTC applications with high latency communications. It is defined that "Maximum latency" is, from the application point of view, the time elapsed from the moment that an AS application sends DL data to a 3GPP constrained device on an existing IP connection, until the device has received the DL data. So, from RAN2 perspective, it is considered that the maximum response time is equal to the time between the arrival of the Page from the MME and the successful reception of the DL data at the UE, i.e., it mainly depends on the paging cycle. If synchronous deployment is assumed, the maximum response time is simply considered as the paging cycle.

Observation 1 The maximum response time is determined by the paging cycle as it is today, if synchronous deployment is assumed.

SA2 points out the concern of lack of SFN alignment between cells for example, which may occur in asynchronous deployment. As the worst case, it could be considered that a UE has moved from Cell A with SFN=N to Cell B with SFN=N+1, as illustrated in FIG. 10. In this case, the paging is missed once and it needs to wait for the next occasion during the paging cycle configured by e.g., defaultPagingCycle, whereby it occurs even in the current mechanism. Considering the worst case that the paging from the CN occurs in SFN=N+1 and the UE misses the occasion once due to cell reselection, the paging would be received by the UE after {(Paging cycle)−1)+(Paging cycle)} ≒ 2*(Paging cycle), and the UE will make a response after the paging reception.

Observation 2 The maximum response time is considered two paging cycles as it is today, if only two asynchronous cells are taken into account.

Considering in eDRX operation the paging cycle may be configured with very long time, i.e., beyond 2.56 s and up to values to be determined in conjunction with SA2/CT, the UE may move further into Cell C within a paging cycle. In this case, the UE may miss the paging occasion twice and the response time may be increased further. The condition varies depending on configured paging cycle, velocity of the UE, network deployment (i.e., cell size or ISD, inter-site distance) etc. So, RAN2 should discuss whether any special condition should be applicable to eDRX, e.g., the UE itself decides whether to apply longer DRX cycle depending on its velocity.

Observation 3 The maximum response time for idle UEs cannot be ensured under the condition with very long paging cycle, high speed UE and shorter ISD deployment if SFN between cells are assumed asynchronous.

Proposal 1 For asynchronous deployment with very long paging cycle, the excessive response time for idle UEs can be mitigated if the UE is allowed to apply special condition for eDRX.

Connected mode case;

For connected mode, the WID states as follows;

No connected mode mobility enhancements are considered in this work, i.e., the current mobility, RRM/RLM procedures apply for UEs using extended DRX cycles in connected mode.

According to the current RRM specification, the requirements of time to identify a new detectable FDD/TDD intra-frequency cell, i.e., Tidentify_intra, is specified as "20*(DRX Cycle)" [s] when the DRX cycle is configured with 2.56 [s]. And for the inter-frequency cell, Tidentify_inter is specified as "20*Kn*Nfreq,n" [s] for normal performance and "20*Kr*Nfreq,r" [s] for reduced performance, where Kn=1 when IncMon is applied, Nfreq=Nfreq,n+Nfreq,r which represents the number of carriers being monitored. These requirements affect the latency of measurement reporting, thus it has impact to handover delay. It will be more severe with eDRX, i.e., long DRX cycle, since 204.8 [s] delay is expected even for intra-frequency case if the existing coefficient is assumed and 10.24 [s] is configured as DRX cycle (20*10.24 [s]). Apart from the increased handover failure, it will cause access delay similar to the Idle mode case, regardless of synchronous/asynchronous deployment. In order to avoid such failure and ensure the maximum response time, the serving cell should carefully choose the UEs to be configured with eDRX, e.g., only stationary UEs are configured to use the longer DRX cycle.

Proposal 2 The maximum response time for connected UEs can be ensured and equal to the DRX cycle as long as the serving cell carefully chooses UEs for eDRX.

Other aspects;

Since the handling of maximum response time in application layer is likely a new concept. The relation between the maximum response time and DRX cycle should be carefully considered. From RAN2"s perspective, the latency between the data input from higher layer and transmission/reception of the data over the radio interface should also be taken into account, e.g., RACH procedure, RRC Connection Setup, resource allocation etc. So, RAN2 should inform SA2 that the latency over radio interface needs to be accounted for in addition to the DRX cycle. Note that it's out of RAN2 scope how to handle the latency through CN nodes.

Proposal 3 The maximum response time should also take into account some margin for the delay related to call setup and QoS control.

(2.2. Issue 2)

The issue 2 could be understood as the same situation in the issue 1, but applicable to only idle mode.

Issue 2:

How to maintain level of reliability for UE being able to receive the paging at its paging occasion similar to paging reliability for normal DRX, even when UE has performed cell reselection.

Unless cell reselection is performed, the reliability to receive the paging at its paging occasion could be the same with that for the existing DRX mechanism. Even if cell reselection occurs, synchronous deployment can ensure similar paging reliability as it is today. For asynchronous deployment, the reliability can be maintained with by applying a special rule, e.g., UE ensure avoids cell reselection during eDRX since cell reselection between asynchronous cells caused the most severe problem. As discussed in 2.1, the reliability will also depend on configured paging cycle, moving velocity of UE, network deployment.

Proposal 4 RAN2 should discuss whether any special rule for eDRX should be applicable to ensure reliability of paging reception in asynchronous deployment.

(2.3. Issue 3)

The issue 3 is quoted below;

Issue 3:

Impact on idle mode UE measurement and cell reselection

For the RAN2 specification on idle mode procedure, there is no relationship between the paging cycle and the cell reselection. It is expected that the principle will be reused in eDRX operation. So, no impact can be seen.

However, the RAN4 specifications may be impacted. So, RAN2 should send an LS to RAN4 to ask analysis of impact on idle mode UE measurement and cell reselection with eDRX.

Proposal 5 RAN2 should send an LS to RAN4 to ask their analysis on Issue 3.

INDUSTRIAL APPLICABILITY

The present invention is useful in the field of communication.

The invention claimed is:

1. A radio terminal used in a mobile communication system, comprising:
   a receiver; and
   a controller configured to perform controls related to an extended discontinuous reception (DRX) operation for intermittently monitoring a downlink control channel based on a comparison result of a value related to a moving speed of the radio terminal and a threshold value when the extended DRX operation is set from a network, wherein the controller is further configured to perform measurement on downlink reference signals based on measurement setting information received from the network, the measurement setting information includes a report condition indicating a condition under which a measurement report is transmitted to the network, and the controller is further configured to change the report condition according to the value related to the moving speed of the radio terminal.

2. The radio terminal according to claim 1, wherein the controller is further configured to perform the measurement with a predetermined measurement cycle based on the measurement setting information, and the controller is further configured to change a measurement cycle to a measurement cycle shorter than the predetermined measurement cycle when the value related to the moving speed of the radio terminal exceeds the threshold value.

3. The radio terminal according to claim 2, wherein the predetermined measurement cycle is decided according to a DRX cycle in the extended DRX operation.

4. The radio terminal according to claim 2, wherein the controller is further configured to transmit a scheduling request or a random access preamble to the network when a measurement result satisfies a report condition indicating a condition under which a measurement report is transmitted to the network.

5. The radio terminal according to claim 4, wherein the controller is further configured to stop the extended DRX operation after transmitting the scheduling request or the random access preamble to the network.

6. The radio terminal according to claim 5, wherein the controller is further configured to give a notification indicating that the extended DRX operation is stopped to the network by transmitting a special buffer state report to the network after transmitting the scheduling request.

7. The radio terminal according to claim 5, wherein the controller is further configured to give a notification indicating that the extended DRX operation is stopped to the network by transmitting a special connection request message to the network after transmitting the random access preamble.

8. The radio terminal according to claim 5, wherein the controller is further configured to stop the extended DRX operation, and to transition to a predetermined DRX operation having a shorter DRX cycle than the extended DRX operation.

9. The radio terminal according to claim 8, wherein the controller is further configured to:

hold first DRX setting information including a first DRX parameter for the extended DRX operation and second DRX setting information including a second DRX parameter for the predetermined DRX operation, and apply a combination of a part of the first DRX parameter and a part of the second DRX parameter to the predetermined DRX operation.

10. The radio terminal according to claim 4, wherein the controller is further configured to continuously perform the extended DRX operation even after transmitting the scheduling request or the random access preamble to the network.

11. The radio terminal according to claim 1, wherein the controller is further configured to set the threshold value based on threshold value information received from the network.

12. The radio terminal according to claim 1, wherein the controller is further configured to set the threshold value based on a DRX cycle in the extended DRX operation.

13. The radio terminal according to claim 1, wherein the controller is further configured to set the threshold value based on at least one of cell size information indicating a size of a cell and a measurement value obtained by the measurement.

14. The radio terminal according to claim 1, wherein the controller stops the extended DRX operation when the value related to the moving speed of the radio terminal exceeds the threshold value.

15. The radio terminal according to claim 14, wherein the controller is configured to stop the extended DRX operation when the value related to the moving speed of the radio terminal exceeds the threshold value under a circumstance in which the network is in an inter-cell asynchronous state.

16. The radio terminal according to claim 14, wherein the controller is further configured to transmit information indicating whether or not the extended DRX operation is stopped to the network.

17. A radio terminal used in a mobile communication system, comprising:

a receiver; and a controller configured to perform controls related to an extended discontinuous reception (DRX) operation for intermittently monitoring a downlink control channel based on a comparison result of a value related to a moving speed of the radio terminal and a threshold value when the extended DRX operation is set from a network, wherein the controller is configured to stop the extended DRX operation when the value related to the moving speed of the radio terminal exceeds the threshold value under a circumstance in which the network is in an inter-cell asynchronous state, and the controller is further configured to acquire information indicating that the network is in the inter-cell asynchronous state from the network.

18. A radio terminal used in a mobile communication system, comprising:

a receiver; and a controller configured to perform controls related to an extended discontinuous reception (DRX) operation for intermittently monitoring a downlink control channel based on a comparison result of a value related to a moving speed of the radio terminal and a threshold value when the extended DRX operation is set from a network, wherein the controller is configured to stop the extended DRX operation when the value related to the moving speed of the radio terminal exceeds the threshold value under a circumstance in which the network is in an inter-cell asynchronous state, and the controller is further configured to perform measurement on radio signals, and to autonomously determine whether or not the network is in the inter-cell asynchronous state.

19. A processor device configured to control a radio terminal of a mobile communication system, the processor further configured to comprising:

at least one processor configured to perform controls related to an extended DRX operation for intermittently monitoring a downlink control channel based on a comparison result of a value related to a moving speed of the radio terminal and a threshold value when the extended DRX operation is set from a network, wherein the least one processor is further configured to perform measurement on downlink reference signals based on measurement setting information received from the network, the measurement setting information includes a report condition indicating a condition under which a measurement report is transmitted to the network, and the least one processor is further configured to change the report condition according to the value related to the moving speed of the radio terminal.

* * * * *